PORTABLE DRILL RIG METHODS AND APPARATUS
Original Filed July 11, 1960 15 Sheets-Sheet 1
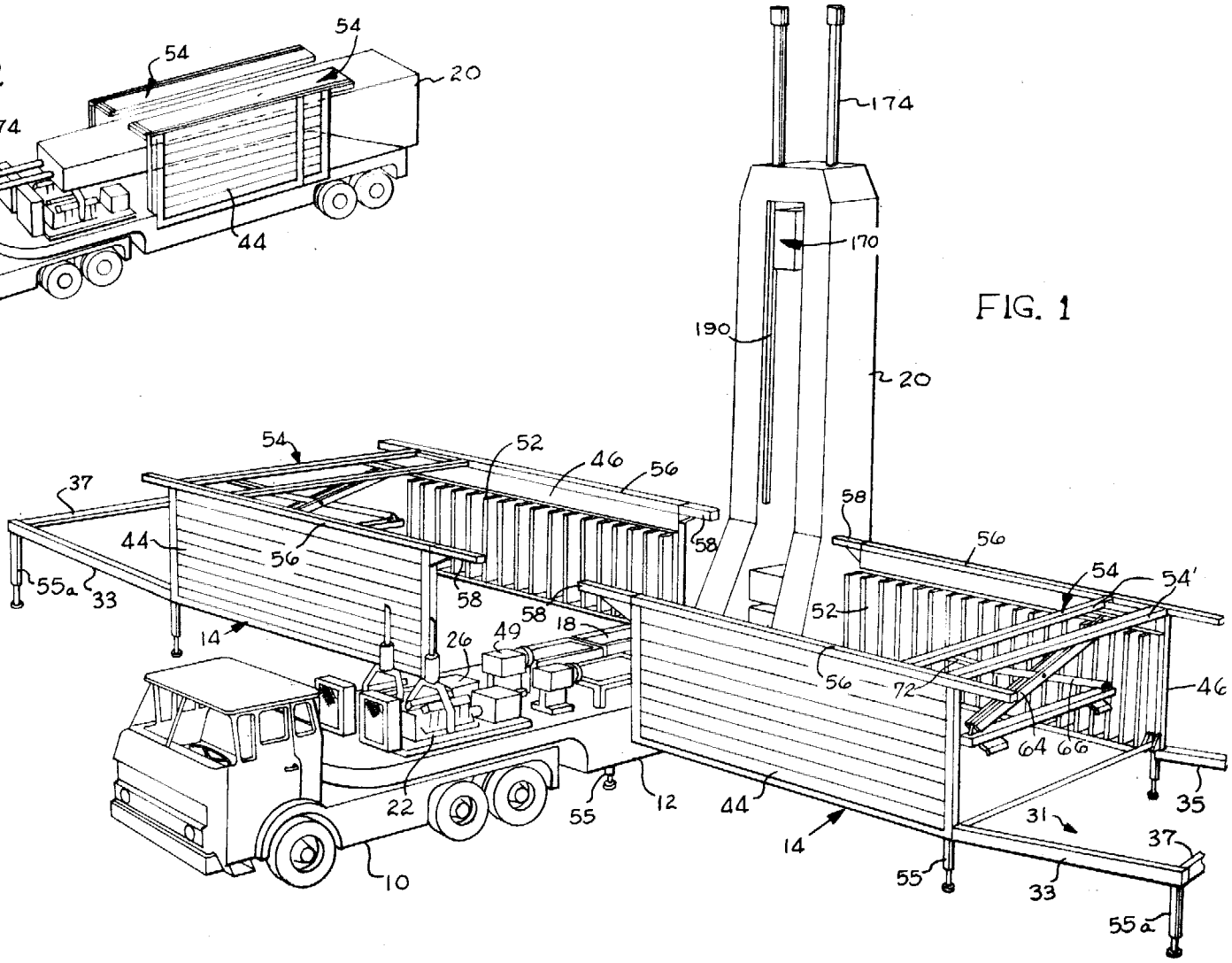
INVENTOR.
JOSEPH V. O'NEILL
BY GEORGE HOMANICK
WILSON, SETTLE, McRAE & CRAIG

PORTABLE DRILL RIG METHODS AND APPARATUS

Original Filed July 11, 1960 15 Sheets-Sheet 2

INVENTOR.
JOESPH V. O'NEILL
GEORGE HOMANICK
BY
WILSON, SETTLE, McRAE & CRAIG

PORTABLE DRILL RIG METHODS AND APPARATUS

Original Filed July 11, 1960 15 Sheets-Sheet 3

INVENTOR.
JOSEPH V. O'NEILL
GEORGE HOMANICK
BY
WILSON, SETTLE, McRAE & CRAIG

PORTABLE DRILL RIG METHODS AND APPARATUS

Original Filed July 11, 1960 15 Sheets-Sheet 4

INVENTOR.
JOESPH V. O'NEILL
GEORGE HOMANICK
BY
WILSON, SETTLE McRAE & CRAIG

PORTABLE DRILL RIG METHODS AND APPARATUS

Original Filed July 11, 1960

INVENTOR.
JOESPH V. O'NEILL
BY GEORGE HOMANICK
WILSON, SETTLE, McRAE & CRAIG

PORTABLE DRILL RIG METHODS AND APPARATUS

Original Filed July 11, 1960 15 Sheets-Sheet 6

INVENTOR.
JOESPH V. O'NEILL
BY GEORGE HOMANICK
WILSON, SETTLE, McRAE & CRAIG

PORTABLE DRILL RIG METHODS AND APPARATUS
Original Filed July 11, 1960 15 Sheets-Sheet 7
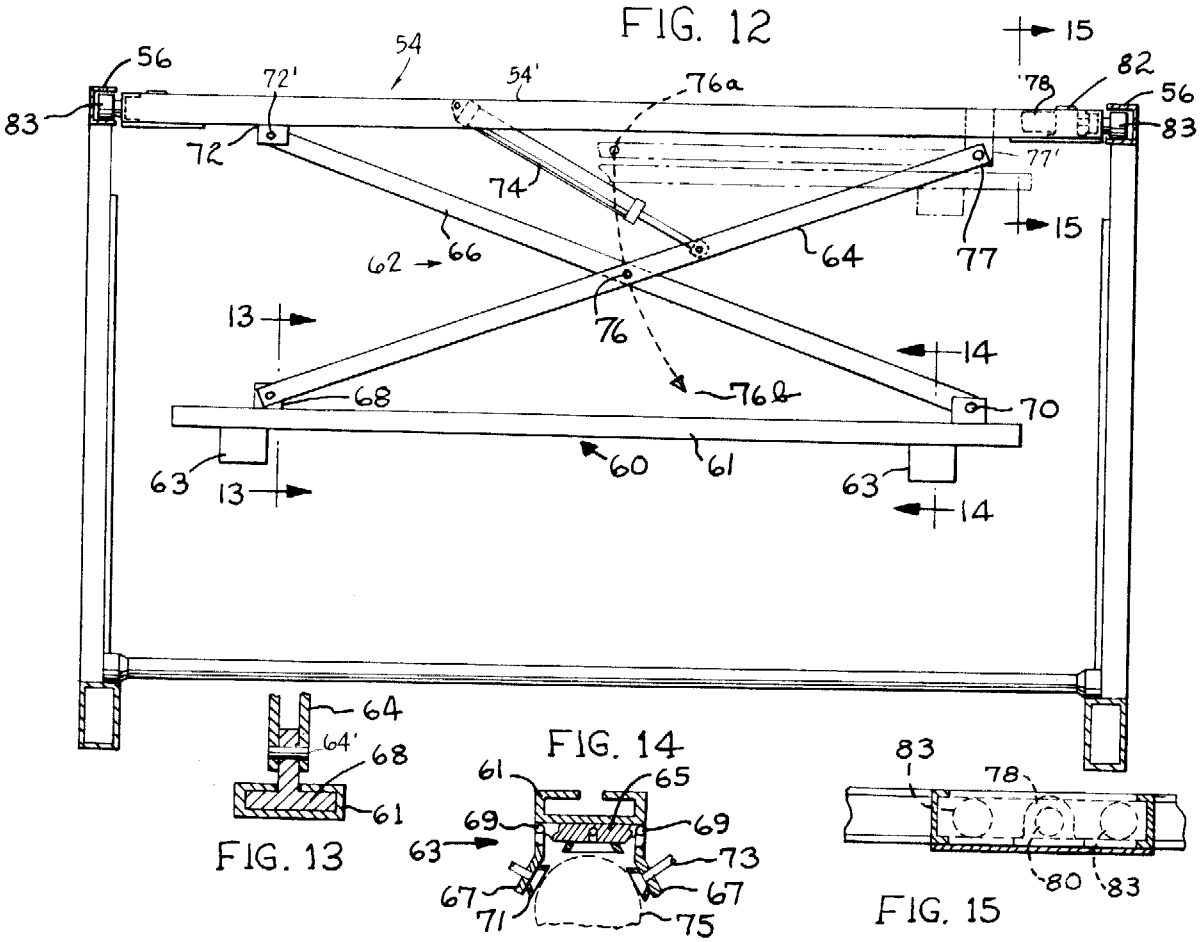
INVENTOR.
JOSEPH V. O'NEILL
BY GEORGE HOMANICK
WILSON, SETTLE, McRAE & CRAIG INVENTOR
JOSEPH V. O'NEILL
BY GEORGE HOMANICK
WILSON, SETTLE, McRAE & CRAIG

PORTABLE DRILL RIG METHODS AND APPARATUS

Original Filed July 11, 1960 15 Sheets-Sheet 9

INVENTOR.
JOSEPH V. O'NEILL
GEORGE HOMANICK
BY
WILSON, SETTLE, McRAE & CRAIG

PORTABLE DRILL RIG METHODS AND APPARATUS
Original Filed July 11, 1960 15 Sheets-Sheet 10
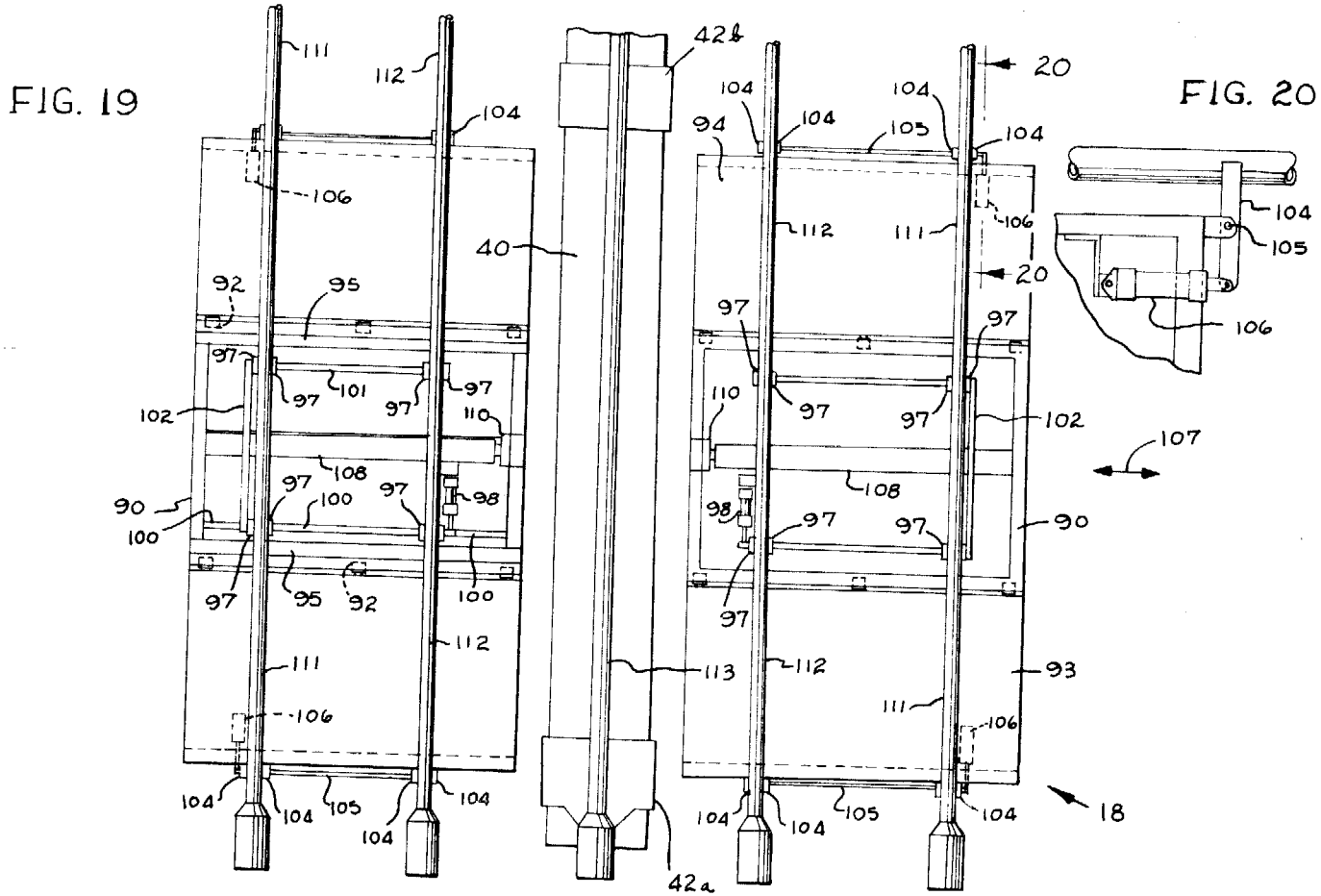
INVENTOR.
JOSEPH V. O'NEILL
BY GEORGE HOMANICK
WILSON, SETTLE, McRAE, & CRAIG INVENTOR.
JOSEPH V. O'NEILL
GEORGE HOMANICK
BY
WILSON, SETTLE, McRAE & CRAIG

PORTABLE DRILL RIG METHODS AND APPARATUS

Original Filed July 11, 1960

INVENTOR.
JOSEPH V. O'NEILL
BY GEORGE HOMANICK
WILSON, SETTLE, McRAE & CRAIG

PORTABLE DRILL RIG METHODS AND APPARATUS

Original Filed July 11, 1960 15 Sheets-Sheet 13

INVENTOR.
JOESPH V. O'NEILL
BY GEORGE HOMANICK
WILSON, SETTLE, McRAE & CRAIG

PORTABLE DRILL RIG METHODS AND APPARATUS

Original Filed July 11, 1960 15 Sheets-Sheet 14

INVENTOR.
JOSEPH V. O'NEILL
BY GEORGE HOMANICK
WILSON, SETTLE, McRAE & CRAIG

PORTABLE DRILL RIG METHODS AND APPARATUS

Original Filed July 11, 1960

INVENTOR.
JOSEPH V. O'NEILL
BY GEORGE HOMANICK
WILSON, SETTLE, McRAE & CRAIG

United States Patent Office

Re. 26,284
Reissued Oct. 17, 1967

26,284
PORTABLE DRILL RIG METHODS AND APPARATUS

Joseph V. O'Neill, Inkster, Mich., and George Homanick, West Hartford, Conn., assignors, by direct and mesne assignments, to Leyman Corporation, Cincinnati, Ohio Original No. 3,145,786, dated Aug. 25, 1964, Ser. No. 42,132, July 11, 1960. Application for reissue June 7, 1966, Ser. No. 562,927
13 Claims. (Cl. 175—57)

Matter enclosed in heavy brackets [ ] appears in the original patent but forms no part of this reissue specification; matter printed in italics indicates the additions made by reissue.

This invention relates to oil well drilling apparatus and particularly to mechanism for shuttling pipe into and out of the well hole drill string.

In the drilling of oil wells there is usually employed a rotary bit or drill which is powered from above the earth's surface by a suitable rotary drill head. The bit is carried on the lower end of a drill string which is made up of a series of short connected pipe sections. In order to satisfactorily form the hole the cuttings formed by the bit must be carried out of the well hole, and for this purpose a mud slurry is pumped downwardly through the pipe so as to gather the cuttings from adjacent the bit and pump same upwardly around the outside of the pipe surface.

The drilling operation may continue for a considerable depth into the earth, as for example 10,000 feet or more, and the length of the drill string must be increased as the drilling operation proceeds. Periodically the bit will become worn or broken during the drilling operation and in such cases it is necessary to replace the bit by bringing it to the surface. In order to effect the bit replacement operations the individual pipes in the drill string must be disconnected from one another and temporarily stored above the earth surface before their assimilation back into the drill string.

The bit replacement operations are very time-consuming when it is realized that each of the individual pipes must be disconnected from the string. The individual pipes may vary in length according to the size of the drilling rig, but if we assume a typical pipe length to be 20 feet and a drilling depth to be 10,000 feet, we will employ 500 pipes, which will require 500 disconnecting operations and 500 connecting operations during each bit replacement operation.

It will be appreciated that as the pipes come from the well hole they must be stored in orderly positions so that they may be as quickly as possible reassembled into the strong after replacement of the bit. The individual pipes are necessarily relative heavy and cumbersome, such as to make it very desirable to utilize automatic mechanisms for handling and controlling the pipes while they are out of the drill string.

One object of the present invention is to provide a drilling rig having improved pipe storage means and pipe transfer means for shuttling the pipe between the drill string and the storage means.

A further object of the invention is to provide a drilling rig with pipe storage means which can handle a relatively large number of pipes.

A still further object of the invention is to provide a drilling rig with pipe storage means and simplified *methods and apparatus* [automatic means] for transferring the pipe between the storage means and drill string.

Another object of the invention is to provide a drilling rig with pipe transfer [means so as] *methods and apparatus designed* to eliminate manual handling of the pipe.

An additional object is to provide a drilling rig which may be transported between drilling sites and which may be quickly set up at each drilling site so as to provide a self-contained pipe storage means as an integral part of the rig.

Another object of the invention is to provide a drilling rig with a pipe storage area of relatively large pipe capacity and with a temporary pipe receiver device for facilitating the unloading of pipe from hauling vehicles at the drilling site.

A further object of the invention is to provide a portable drilling rig wherein a single trailer construction is utilized to operatively mount a derrick structure and foldable pipe storage means.

A still further object of the invention is to provide a construction including a trailer having (1) a derrick at its rear end mounted for downward pivotal movement to a prone transit position, and (2) a pair of wings pivotally mounted on each of its sides for unfoldment from the retracted transit positions along the trailer lateral sides to extended positions for storage of drill pipe at the drilling site.

An additional object of the invention is to provide a portable drilling rig having (1) a derrick structure foldable into a prone transit position, (2) pipe storage structures foldable to transit positions located along opposite sides of said derrick structure, and (3) pipe pick-up structures movable into transit positions overlying the derrick.

A general object of the invention is to provide a portable oil well drilling rig having an improved, self-contained system of parts for storing pipe and *improved methods and apparatus for* automatically transferring individual pipes between the storing area and the drill string.

A further object of the invention is to provide a portable drilling rig having a trailer on which are located a series of pipe-treating substations for performing such operations as thread cleaning, strength testing, and sealant application.

Another object of the invention is to provide a portable drilling rig having a pipe storage means and a conveying mechanism which operates to shuttle the pipe between the drill string and storage means with a minimum change of direction in the pipe.

An additional object of the invention is to provide a portable drilling rig wherein the cooperating parts can be set up at the drilling site in a relatively short time period.

Other objects of this invention will appear in the following description and appended claims, reference being had to the accompanying drawings forming a part of this specification wherein like reference characters designate corresponding parts in the several views.

In the drawings:

FIG. 1 is a perspective view of a portable drilling rig constructed according to the invention, with certain components thereof removed to better illustrate the general arrangement of parts.

FIG. 2 is a reduced perspective view of the FIG. 1 rig, with certain components thereof folded onto one another to facilitate transportation of the rig between drilling sites.

FIG. 8 is an enlarged view of a portion of the structure shown in FIG. 4 and illustrating the manner in which the pipe storage walls may be unfolded from the FIG. 4 position to the FIG. 6 position.

FIG. 9 is an enlarged fragmentary sectional view taken on line 9—9 in FIG. 8.

FIG. 10 is an enlarged view, partly in section, showing attachment of inner track extensions to the side wall tracks.

FIG. 11 is a top plan view of of the structure shown in FIG. 10, but taken on a reduced scale.

FIG. 12 is an enlarged view taken on line 12—12 in FIG. 6.

FIG. 13 is a fragmentary sectional view taken on line 13—13 in FIG. 12.

FIG. 14 is a fragmentary sectional view taken along line 14—14 in FIG. 12.

FIG. 15 is an enlarged sectional view taken on line 15—15 in FIG. 12.

FIG. 19 is a top plan view of the mechanism illustrated in FIGS. 16 and 18.

FIG. 20 is a fragmentary view taken substantially along line 20—20 in FIG. 19.

Figure 3:
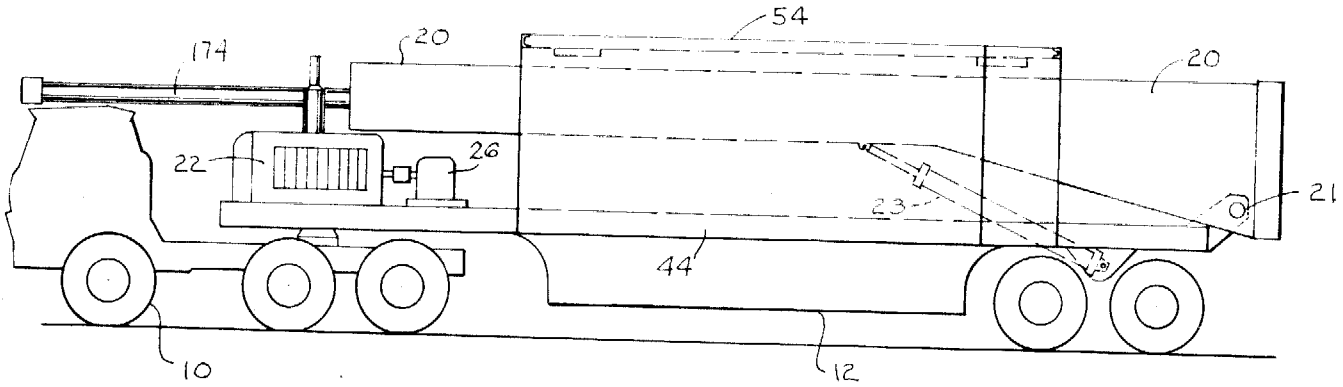
FIG. 3 is a side elevational view of the FIG. 1 rig, with the parts thereof in the folded transit position.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly to FIG. 1, there is shown a portable oil well drilling apparatus comprising a semi-trailer including a tractor 10 and a trailer 12 connected therebehind. The trailer provides a platform which mounts two outboard pipe storage stations 14, a central pipe treating and positioning station 18, and a derrick 20. The trailer portion forwardly of the pipe treating station may be utilized to mount one or more diesel engines 22 and fluid pumps 26. The fluid pressures developed by these pumps may be utilized in various operations, as for example erecting the derrick, raising and lowering the drill string in the well hole, and transferring the pipe to and from storage stations 14.

Figure 4:
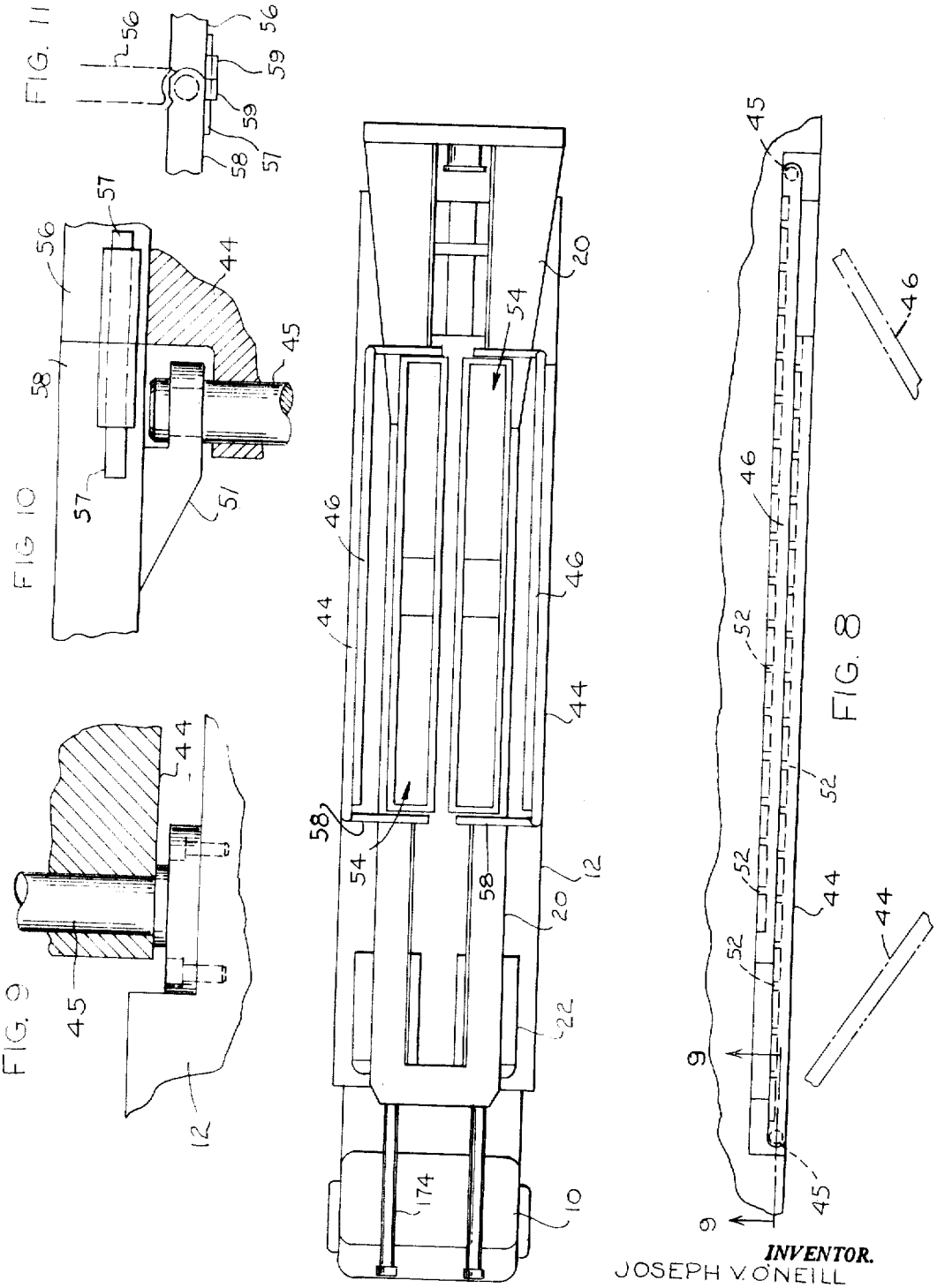
FIG. 4 is a top plan view of the rig in its FIG. 3 position.

FIGS. 2, 3 and 4 show the drilling apparatus in its folded or knockdown condition ready to be transported to a new drilling site. It will be noted that in the transport position the derrick 20 is pivoted downwardly about the horizontal pivot 21 (FIG. 3) into a prone position extending longitudinally toward the tractor 10. After the derrick is in its prone position the pipe trolleys 54 are moved inwardly from the FIGS. 1 and 6 positions to the positions shown in FIGS. 3 and 4 wherein they overlie the prone derrick. As the next step in dismantling the rig the walls 44 and 46 (which define pipe storage stations 14) are folded from their FIG. 6 extended positions into their FIG. 4 retracted positions. These folding operations take place about the vertical pivot shafts 45 as illustrated in FIG. 8.

Figure 5:
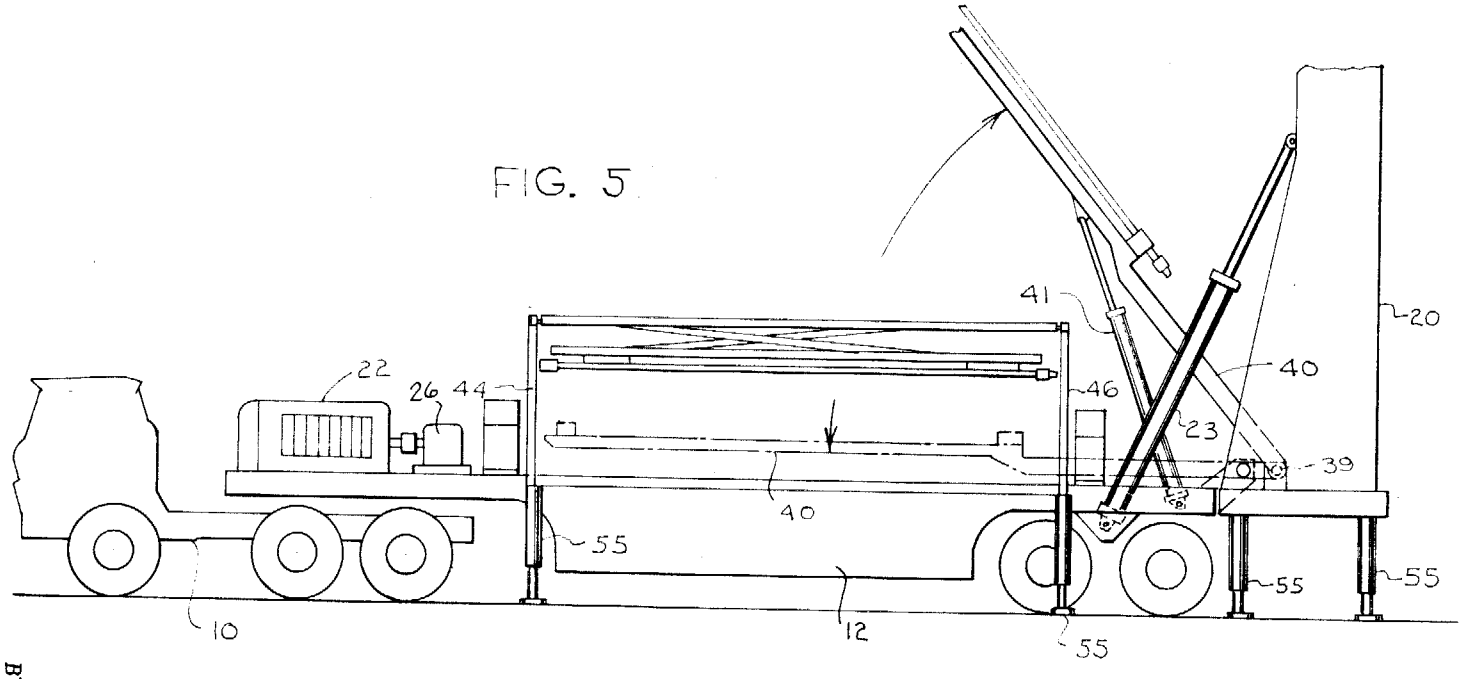
FIG. 5 is a side elevational view of the FIG. 1 construction, illustrating the general arrangement of parts for transferring the drill pipe from the pipe storage areas into the drill string.
Figure 6:
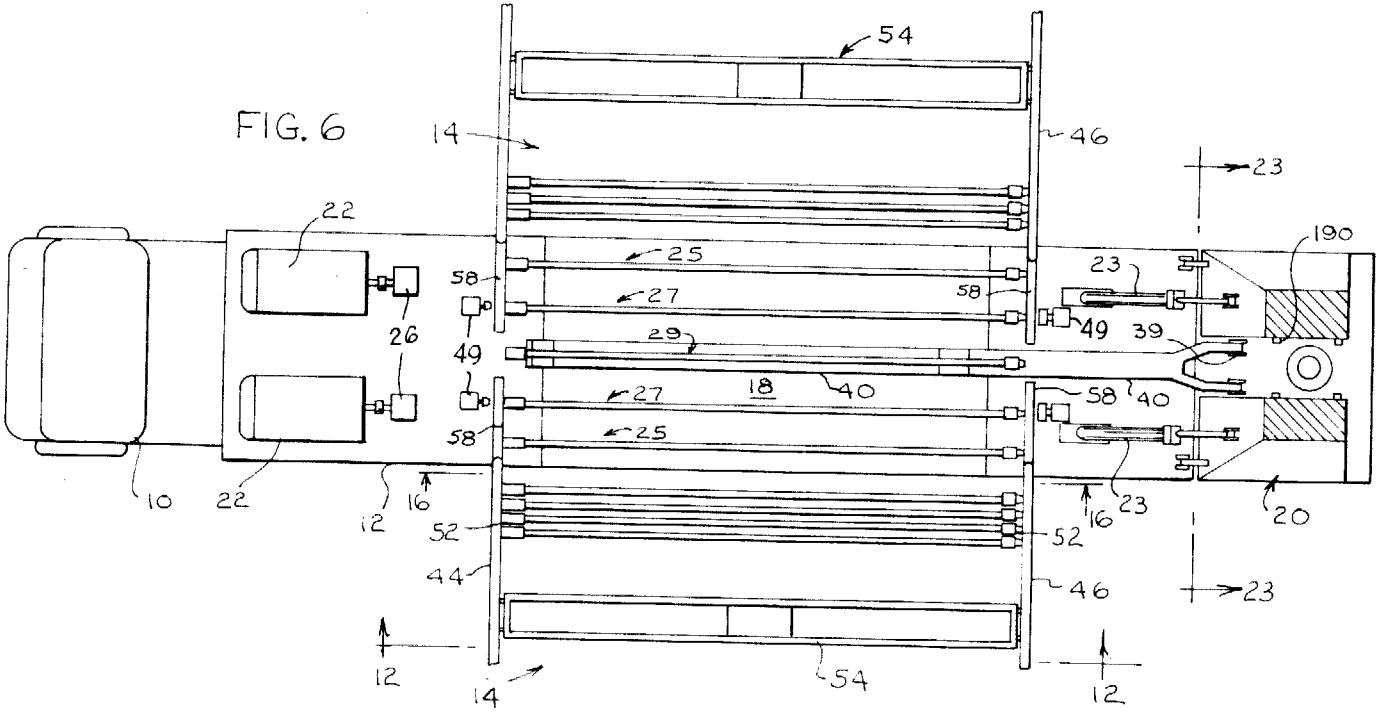
FIG. 6 is a top plan view taken in the same direction as FIG. 4 but illustrating the components in their unfolded operating positions.
Figure 7:
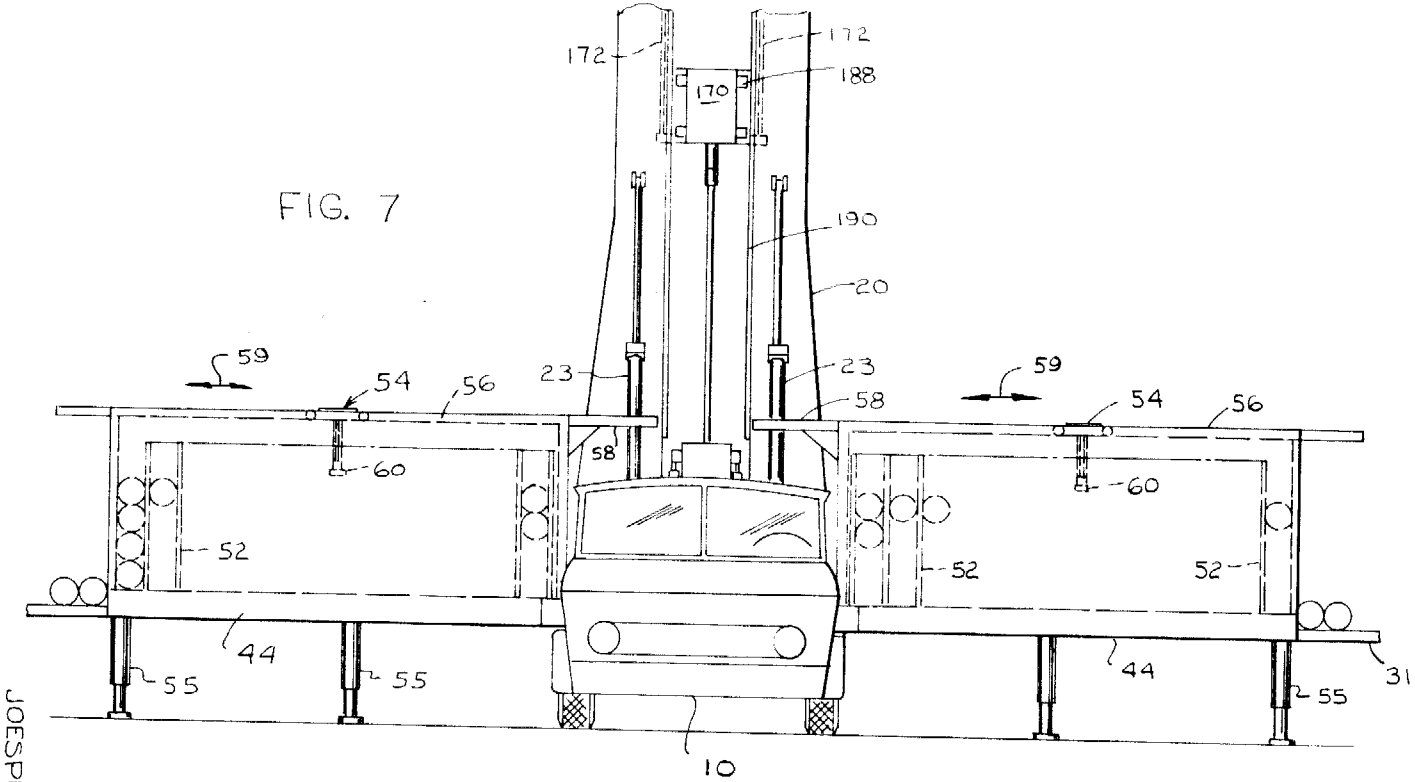
FIG. 7 is a front elevational view of the FIG. 1 rig.

After the rig has been transported to the next drilling site the process is reversed, i.e. the walls 44 and 46 are folded outwardly, to the pipe-receiving positions shown in FIGS. 1 and 6, after which the trolleys 54 are moved outwardly on the trackways 56 which extend along the upper edges of walls 44 and 46. The derrick 20 can then be pivoted upwardly to the operating position by energizing the fluid cylinders 23 (FIG. 5). These cylinders are omitted from FIG. 1 for clarity of illustration of other mechanisms.

Figure 18:
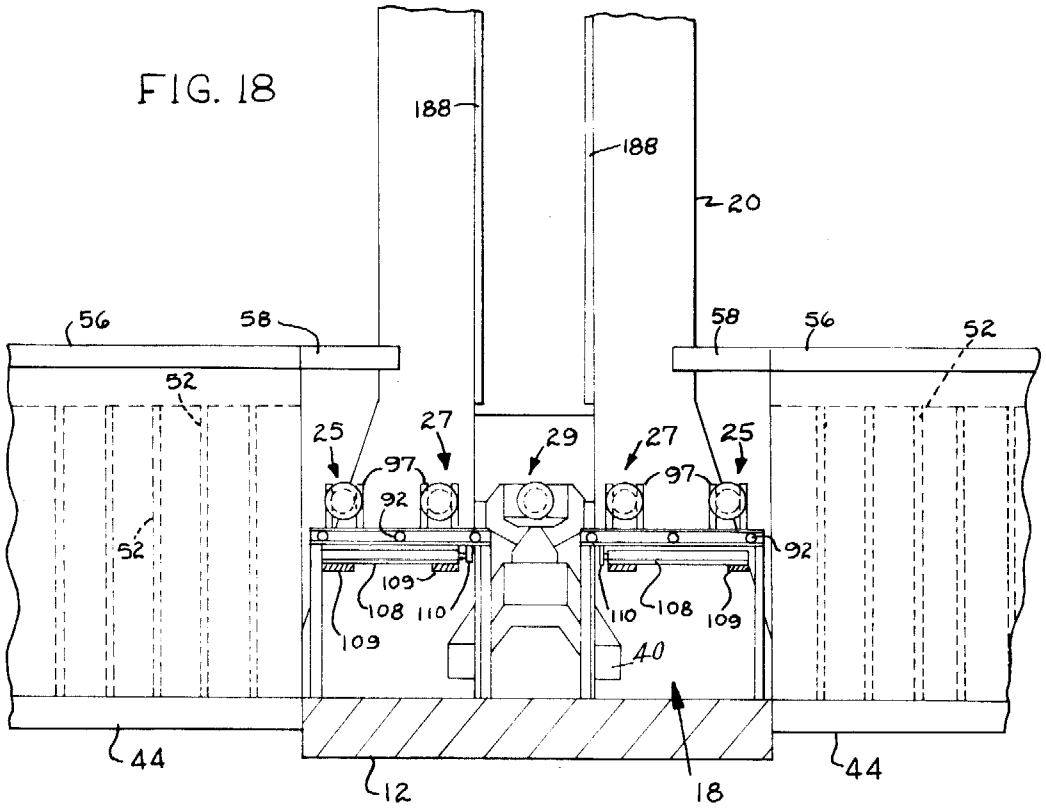
FIG. 18 is a view taken substantially on line 18—18 in FIG. 16.

During the well drilling operation the drill pipes not in current use within the string are stored horizontally between the opposed walls 44 and 46 (i.e. in the storage stations 14). As an individual pipe is needed in the drill string one of the trolleys 54 is operated to extract a selected pipe from station 14 and deposit the selected pipe in the positioning-treating station 18. A shuttle mechanism shifts the deposited pipe horizontally between the three sub-stations designated by numerals 25, 27 and 29 (FIGS. 6 and 18). One or more of the sub-stations may include mechanism for treating the pipe, e.g. tensile strength testing, thread cleaning, or lubricant applying. By reference to FIG. 18 it will be seen that there are two sub-stations designated by numeral 25, two sub-stations designated by numeral 27, and only one substation designated by numeral 29. This arrangement permits the pipe to most expeditiously be received from pipe storage stations 14, using a separate trolley 54 from each pipe storage station. The central sub-station 29 receives pipe from both of the adjacent sub-stations 27.

As an individual pipe sits within sub-station 29 it overlies an elongated arm 40 which is pivotally mounted at 39 within the derrick 20 (FIG. 5) to swing in a vertical arc under the impetus of fluid cylinder 41. Arm 40 mounts two pipe-engaging jaws, so that during upward movement of the arm the pipe within sub-station 29 is picked up and transferred to the drill string within derrick 20. The apparatus within the derrick (FIG. 23) then assembles the transferred pipe into the string to lengthen the string and thereby enable the well drilling operation to proceed.

As the drilling operation proceeds the transfer arm 40 may be utilized to transfer pipe into and out of the drill string, during periods of drilling as well as during bit replacement periods. With certain alterations the transfer arm may also be utilized to transfer individual casing into the casing string.

Figure 23:
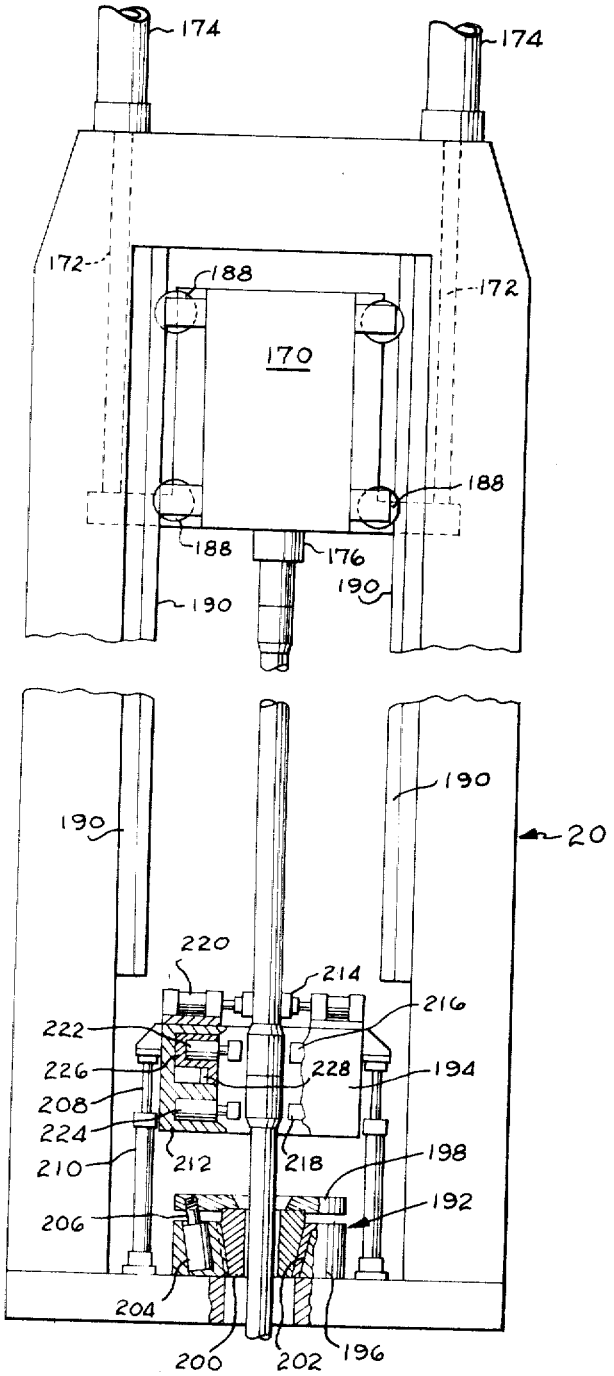
FIG. 23 is a view taken substantially along line 23—23 in FIG. 6 and illustrating the general arrangement of parts for assembling and suspending a drill string within a well hole.

From the above brief description it will be seen that the illustrated apparatus comprises essentially the following operating components:

(1) Pipe storage stations 14
(2) Pipe trolleys 54
(3) Pipe treating station 18 and its shuttle mechanism
(4) Pipe transfer arm 40
(5) Drill string suspension and assembling means (FIG. 23).

These components may be varied as to detail of construction as will be apparent after elaboration herein of their general modes of operation.

PIPE STORAGE STATIONS 14

(FIGS. 1, 4, 6 and 8)

As previously indicated, each pipe storage station 14 includes a first upright wall 44 and a second upright wall 46. Each of these walls may be pivotally mounted on the trailer 12 for arcuate horizontal movement, as by means of a fixed post 45 which preferably extends upwardly from trailer 12 for the full height of the supported wall. It will be seen from FIGS. 4 and 8 that wall 44 can be swung outwardly from its position extending along the length of the trailer, and that wall 46 can then be swung outwardly from its position extending along the trailer length to the position of FIGS. 1 and 6. When walls 44 and 46 have been swung out to their FIG. 1 positions they may be utilized to form a storage bin for containment of a large number of drill pipe. In order to dispose the stored pipes in orderly positions, there may be provided a series of pipe separator 52 in each of the wall structures. In the illustrated embodiment these separators form vertical troughs or pockets which receive the pipe and dispose them in horizontal rows extending between the two wall structures 44 and 46. The weight of a large number of drill pipe is relatively high, and accordingly the wall structures 44 and 46 (as well as other components) may each be provided with subjacent support, as by means of the hydraulic jacks 55 shown in FIG. 1. These hydraulic jacks can be entirely detachable from the supported wall structures for individual transportation, or they can be self-contained within or on the supported wall structures during transport periods.

It will be appreciated that while the rig is being transported between drilling sites the drill pipe and casing are carried on separate hauling vehicles not shown herein. After the rig is initially set up at the new site the drill pipe must be unloaded from the hauling vehicles preparatory to their being stored in the pipe storage stations 14. In order to facilitate the unloading operations there may be provided a receiver or bed structure 31 (FIG. 1), which in the illustrated embodiment is comprised of two parallel rails 33 and 35, and an interconnecting bar 37. The outboard ends of the rails may be supported by jacks 55a, and the inboard ends thereof may be supported by suitable engagement with walls 44 and 46. The bed structure may be completely detachable from walls 44 and 46 during periods of transport, or the rails 33 and 35 if desired may be telescoped within horizontal slots formed in the lower portions of walls 44 and 46.

In the FIG. 1 operating position the outboard ends of rails 33 and 35 are preferably at a somewhat higher elevation than the inboard ends so that as the pipe or casing are deposited onto the rails they may roll toward the storage station 14 to positions within reach of the trolley structures 54.

PIPE TROLLEYS 54

(FIGS. 1, 6, 7 and 12)

In its operating condition, each trolley structure 54 extends between the opposed walls 44 and 46 at their upper edges. Each of the walls 44 and 46 is provided with a horizontal elongated trackway 56 to permit the trolley to be moved back and forth in the arrow 59 direction (FIG. 7), the arrangement being such as to permit each trolley to traverse its pipe storage station 14 as well as portions of the bed 31 and station 18. Each trolley is provided with a raiseable and lowerable pipe pick-up structure 60 (FIG. 12) for reaching the pipe on bed 31 and in stations 14 and 18.

As shown in FIG. 12, the pick-up structure 60 comprises an elongated beam 61 and the two separate pipe gripper mechanisms 63. Each pipe gripper mechanism may be varied as to detail, but as shown in the illustrative drawings (FIG. 14) each mechanism may comprise a central wall 65 and two side walls 67 pivotally mounted thereon, as at 69. Each wall carries a ring or frame 71 or rubber or similar deformable material, and the space within each frame is placed in pneumatic communication with a vacuum line, as for example line 73 shown in FIG. 14.

In operation of the pipe gripper machanism, as the rubber frame members 71 contact the pipe surface 75 the vacuum force is trapped within each frame such as to hold the pipe on the gripper mechanism. The pipe may be released by venting the vacuum line in a conventional manner.

Referring to FIG. 12 there is shown a scissors or tong mechanism 62 which expands or contracts to raise and lower the pick-up structure 60 for enabling it to extract a desired pipe from the storage area 14 and to convey the extracted pipe into a position vertically aligned with the sub-station 25 (FIGURE 18). Scissors 62 comprise crossed links 64 and 66. Links 64 are double and straddle single link 66 as shown in FIGURE 1. Further, links 64 have a fixed pivotal connection to a cross rod 77 carried by lugs 77' depending from spaced beams 54' of trolley 54; also see FIGURE 1. At the other end, links 64 have a floating pivotal connection with box beam 61 as by means of a slidable shoe 68, shown in FIGURE 13. Each link 64 fits the end of a pin 64' according to FIGURE 13.

Link 66 has a fixed pivotal connection 70 with beam 61 and a floating pivotal connection 72 to beams 54' at the other end. These comprise a cross rod 72' having shoes of the nature of 68 in FIGURE 13, but inverted, at each end for slidable fit in box beams 54'.

In the illustrated embodiment scissors 62 is operated by the fluid cylinder 74. The beam 61 will of course maintain a horizontal position at all times, and the link connection 76 will move between points 76a and 76b during a full raising-and-lowering operation. During this operation the floating pivots 68 and 72 will move longitudinally of the beam and trolley to permit opening and closing of the scissors.

The trolley 54 may be powered horizontally along tracks 56 by any suitable means, but as shown in the drawings there may be utilized a pair of electric motors 78 in driving engagement with rubber tired wheels 80 (FIG. 15) through the speed reducers 82 (FIG. 12). Suitable guide rollers 83 may be provided to support the weight of the trolley frame and mechanisms suspended therefrom.

In the illustrated embodiment the tracks 56 for the trolley terminate at the inner ends of the walls 44 and 46, and the tracks are therefore provided with extensions 58 (FIGS. 7 and 10) which permit the trolley 54 to move into positions above the substation 25.

The track extensions 58 may be pivotally related to the walls 44 and 46 so as to serve as support structures for the trolleys 54 during transport periods (i.e. when walls 44 and 46 are folded flat against the trailer sides as in FIG. 4). The pivotal relationship may be provided by pivotally mounting the track extensions on the upper ends of post 45 as by means of the arm 51 shown in FIG. 10. FIG. 11 illustrates two positions of track 56 relative to track 58, with the operating position shown in full lines and a folded position shown in dotted lines. As shown in FIG. 10 each track carries a channel 59 of a dimension to receive an elongated slideable latch bar 57. Sliding of bar 57 out of the channels enables the walls 44 and 46 (which carry tracks 56) to be moved from their operating positions to their transit positions (FIG. 4).

PIPE TREATING STATION 18 AND ITS SHUTTLE MECHANISM (FIGS. 16–19)

As will be seen from FIG. 18, station 18 includes two sub-stations 25, two sub-stations 27, and a central sub-station 29. By providing the sub-stations various different operations may be performed on the pipe. In FIGS. 1 and 6 there is illustratively shown a pipe cleaner 49 at each end of the sub-station 27.

In order to shuttle the pipe between sub-stations there is provided a carriage 90 which may be built as a rectangular frame as best shown in FIG. 19. The sides of the carriage 90 may be formed by the outwardly facing channels 91 for receiving the guide rollers 92 mounted in fixed table-like support structures 93 and 94, carried by trailer 12, see FIGURES 16 and 19. In FIGURE 19, these are observed to be flat plate-like platforms extended above the trailer 12, FIGURE 16. The carriage 90 suitably includes spaced I-beams 95 to support the drill pipe 96, best shown in FIGURE 17.

In order to maintain the drill pipe in a stable position on the carriage 90, there are provided a series of fingers 97. As will be seen from a comparison of FIGS. 16 and 17, these fingers may be powered from the extended positions of FIG. 16 to the retracted positions of FIG. 17 as by means of the fluid cylinder 98. In the illustrated embodiment each of the fingers is pivotally mounted on the carriage 90 by means of a pivot shaft 100, and the ends of certain fingers are interconnected by a connecting rod 102, whereby the energization of cylinder 98 is effective to simultaneously move all of the fingers.

It will be seen from FIG. 19 that each of the carriages 90 is provided with eight fingers 97. Four of these fingers are mounted for movement together by securing them to the elongated pivot shaft 100, and the other four fingers are secured together for simultaneous movement by securing them to a common pivot shaft 101. Due to the presence of the connector rod 102 energization of cylinder 98 is effective to simultaneously move all eight of the fingers 97.

It will be seen from FIGS. 19 and 20 that the fixed support structures 93 and 94 are each provided with four additional fingers 104, said fingers being mounted on a common pivot shaft 105 such that energization of a single fluid cylinder 106 is effective to move all four of the fingers between retracted and extended positions.

In order to shuttle the pipe between the sub-stations the carriage 90 is moved in the arrow 107 direction (FIG. 19). Power for this movement may be obtained from a fluid cylinder 108. The piston portion of the cylinder may be connected to the carriage 90 as by means of a bracket 110, and the cylinder portion of the fluid cylinder may be fixedly mounted between supports 93 and 94 as by means of the cross pieces 109 (FIG. 18).

For purposes of differentiating one pipe from another in FIG. 19 we have applied the numerals 111, 112 and 113 to the various pipes disposed within the sub-stations 25, 27 and 29. In operation of the FIG. 19 mechanism the transfer arm 40 is utilized to remove the pipe 113 from the station 18, as by the upward arcuate movement shown best in FIG. 5. After the transfer arm has been returned downwardly to a position below the level of carriage 90, the fluid cylinders 106 may be energized to retract the fingers 104 from positions alongside opposite surfaces of pipes 111 and 112. The cylinder 108 may then be energized to advance the carriage 90 toward the central substation 29 so as to place the pipe 112 in a position previously occupied by pipe 113. The cylinders 106 may then be powered to raise the fingers 104 into positions holding the pipes in their new locations, after which the cylinder 98 may be powered to retract the fingers 97 from the pipe. The cylinder 108 may then be operated in the reverse direction to move the carriage 90 back to its FIG. 19 position.

It will be understood that by this process of energizing the cylinders 98, 106 and 108 in the desired sequence, the various drill pipes can be shuttled from the station 25, to the station 27, and thence to the station 29. While the pipe is being deposited within station 29 the pipe-engaging jaws 42a and 42b of transfer arm 40 are opened to lie at a lower elevation than carriage 90 so as not to interfere with carriage movement.

TRANSFER ARM 40

(FIGS. 5, 6, 16, 21 and 22)

Figure 16:
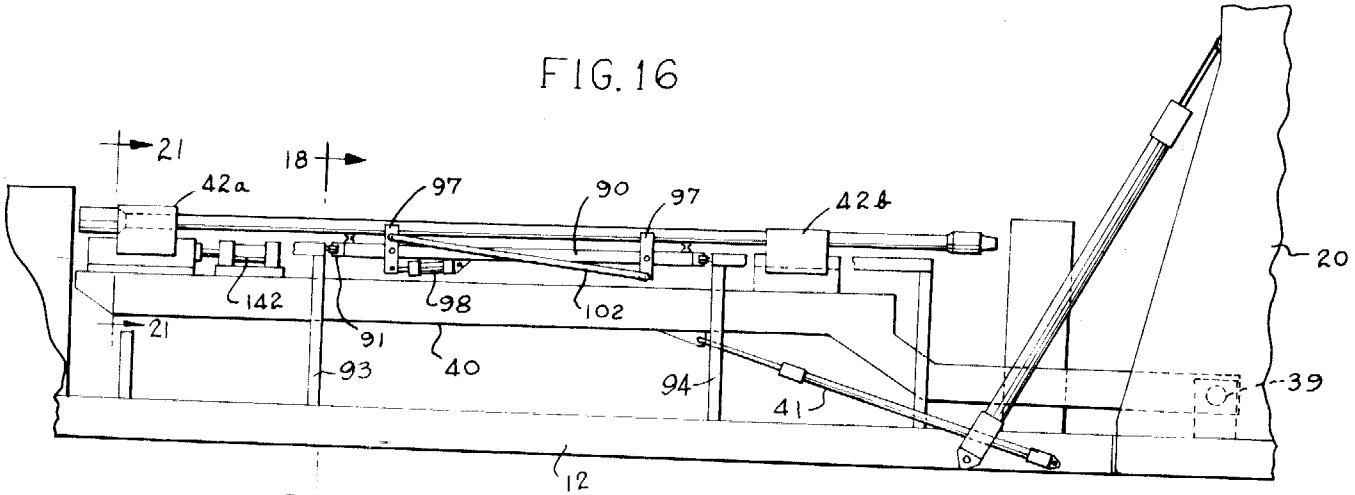
FIG. 16 is an enlarged view taken substantially along line 16—16 in FIG. 6, but with certain pipe storage walls and other support structure removed to better illustrate certain of the operating mechanisms.
Figure 17:
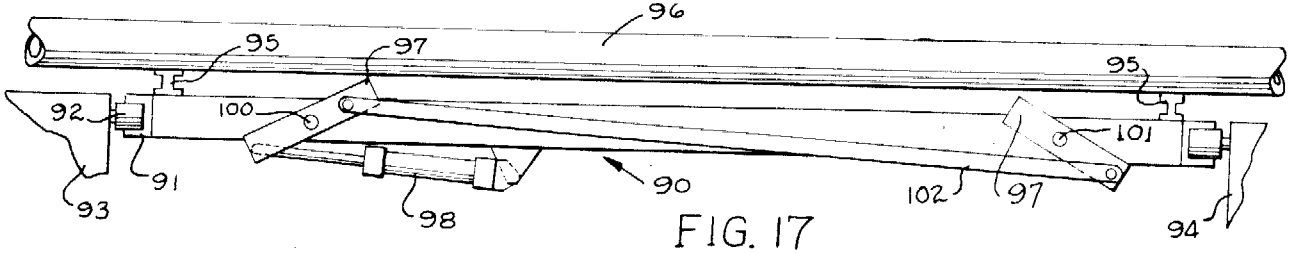
FIG. 17 is an enlarged view of a portion of the structure shown in FIG. 16.
Figure 21:
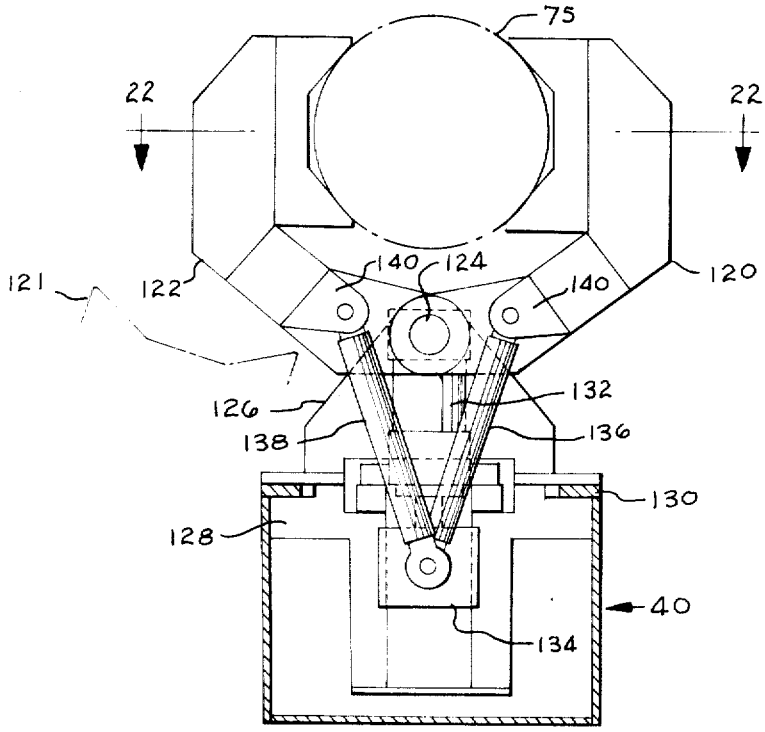
FIG. 21 is a fragmentary view taken substantially on line 21—21 in FIG. 16 and illustrating the operation of a pipe-suspending jaw mechanism.
Figure 22:
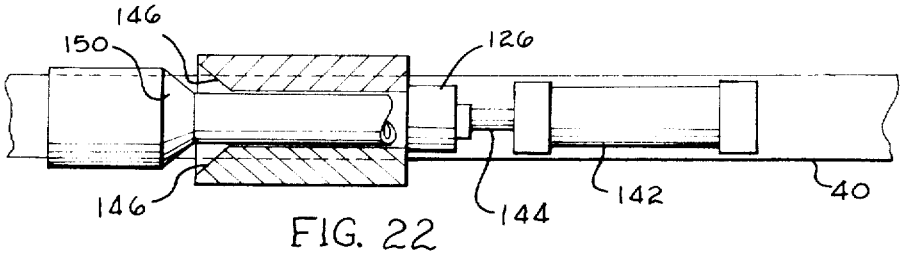
FIG. 22 is a sectional view taken substantially on line 22—22 in FIG. 21 and illustrating the arrangement of parts whereby the jaw structure is moved axially of the pipe to engage a pipe shoulder.

As shown in FIGS. 5 and 16, transfer arm 40 is constructed as an elongated beam having a pivotal connection at 39 with the derrick structure 20. The beam may be of box section as shown in FIG. 21, and the beam may mount two sets of jaws, as shown at 42a and 42b in FIG. 16. The jaw sets may be varied as to detail insofar as the present invention is concerned, but as shown in FIGS. 21 and 22 these jaw sets may each comprise two individual jaws 120 and 122 having a common fulcrum at 124 on a bracket 126. With regard to the jaw structure 42a the bracket 126 may be mounted on a slide structure 128 which slidably engages slideways suitably formed by the transfer arm, as at 130.

In order that the jaws 120 and 122 may clamp against the pipe surface 75, there is provided a fluid cylinder 132, the piston rod of which is connected with a crosshead 134. This crosshead has pivotal connections with the two links 136 and 138, and the links in turn pivotally connect with lugs 140 carried on the jaws 120 and 122. The arrangement is such that introduction of pressure fluid into one end of the cylinder 132 is effective to move the crosshead 134 for thereby causing the links 136 and 138 to open the jaws 120 and 122 to the position indicated by numeral 121. Introduction of pressure fluid into the opposite end of cylinder 132 serves to move crosshead 134 for thereby closing the jaws 120 and 122 against the pipe.

As previously noted, jaw structure 42a preferably has an axially slidable motion on the transfer arm 40. In order to power the jaw structure in the axial directions there is provided a fluid cylinder 142 (FIGS. 16 and 22). The piston rod 144 for this cylinder connects with the bracket 126 and slide structure 128, so that introduction of pressure fluid into the right end of cylinder 142 causes the jaw structure to be advanced axially of the pipe. The left end of each jaw 120 and 122 in jaw set 42a is preferably given a conical configuration as at 146. By this construction the axial movement of the jaw structure is effective to place the jaw surfaces 146 in abutment against the pipe shoulder 150. This feature is of particular advantage when the arm is being utilized in the process of assembling a pipe string within the well hole.

Figure 24:
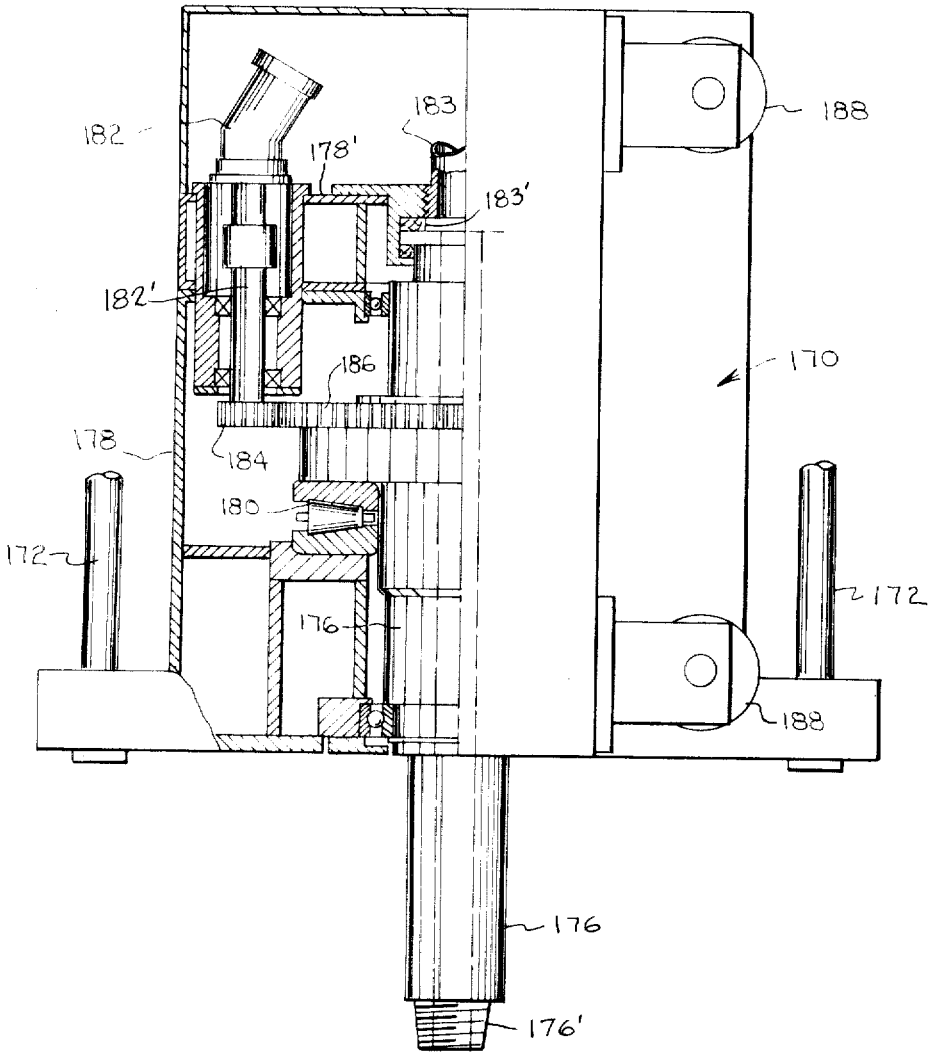
FIG. 24 is a view partly in section taken through a drill head employed in the structure of FIG. 23.

DRILL STRING SUSPENSION AND ASSEMBLING MEANS (FIGS. 23 and 24)

Insofar as the present invention is concerned, the drilling apparatus within the derrick structure 20 may take various different forms. However, for illustration purposes, there is shown in the drawings a drilling apparatus wherein the drill string is suspended from a drill head 170. This head is carried on the lower ends of two piston rods 172 which extend and retract relative to the fluid cylinders 174. It will be appreciated that each of rods 172 connects with a piston within the respective cylinder and that fluid pressure is pumped into the cylinder below the piston to support the weight of the drill string in the well hole.

The cutting operations of the drill bit are performed by controllably lowering the pipe string while rotating same. In order to rotate the string the drill head 170 has its hollow pipe gripping section 176 (FIG. 24) mounted for rotary movement within the housing portion 178, as by means of bearings 180. Gripping section 176 has a thread 176' at the bottom end to mate to the box joint at the upper end of a pipe section. The housing section 178 mounts one or more fluid motors 182, each having on its output shaft 182' a pinion 184 which meshes with a rack section 186 formed on the periphery of the pipe gripper section 176. Mounting is by a cross wall 178'. By this arrangement the section 176 may be rotated as the housing 178 is raised and lowered under the control of the pressure in cylinders 174, FIGURE 1. It will be understood that suitable guide rollers 188 are provided for the housing 178, said rollers operating within fixed vertical tracks 19 disposed within the derrick structure. Drilling mud may be pumped into the drill string via a mud tube 183 and the hollow portion of section 176, a seal 183' being provided to prevent leakage between tube 183 and section 176.

In order to suitably retain the drill string and make and break the joints between the individual pipes there is provided a fixed chuck structure 192 (FIG. 23) and a raiseable-lowerable chuck structure 194. Chuck structure 192 comprises a fixed housing 196 and a superjacent crosshead 198, from which are suspended the pipe-gripping jaws 200. It will be understood that the jaws are suitably keyed to the inclined surfaces 202 of structure 196, such that up-and-down movement of the crosshead is effective to cause the jaws to alternately grip and release the pipe in the string. In order to raise the crosshead 198 there may be provided a fluid cylinder 204 and piston rod 206. During periods of drill string movement the pressure fluid is pumped into the lower ends of cylinder 204 so as to raise crosshead 198 and maintain the jaws 200 out of gripment with the drill string. However when it is desired to temporarily retain and suspend the drill string, as during insertion or removal of pipe from the string, the cylinder 204 is powered downwardly so as to cause the jaws 200 to tightly grip the pipe and suspend the drill string.

For the purpose of making and breaking the joints in the string there is provided the chuck structure 194 and the piston-cylinder means at 208, 210 for raising and lowering same. The chuck structure 194 comprises a non-rotatable housing 212 carried on the piston rods 208 and three sets of jaws numbered respectively from top to bottom as 214, 216 and 218. Jaws 214 are carried on the piston rods of fluid cylinders 220, jaws 216 are carried on the piston rods of fluid cylinders 222, and jaws 218 are carried on the piston rods of fluid cylinders 224. Each of the various fluid cylinders 220 and 224 are immovably secured within the housing 212. Fluid cylinders 222 are carried within a rotary sub-housing 226, one portion of which is provided with an arcuate gear surface, as at 228. An auxiliary fluid cylinder (not shown) having a rack-like piston may be fixedly mounted in the housing 212 (outside of gear section 228) so as to effect a power rotation of the housing 226 when fluid is pumped thereinto, the purpose being to tighten and loosen the pipe joints.

Figure 25:
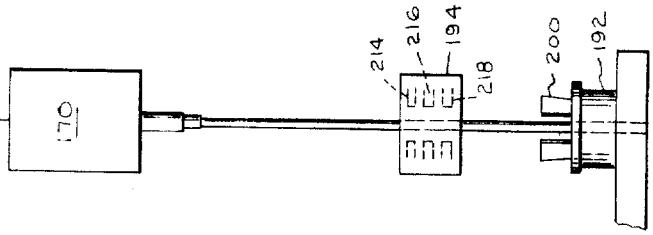

The operation of the FIG. 23 structures may best be understood by reference to the schematic FIGS. 25 through 32 which illustrate the procedure involved in removing a pipe length from the drill string. Referring to FIG. 25, the drill string is shown with the drill head 170 travelling up with the drill string suspended therebelow. The various jaws in structures 192 and 194 are at this time disengaged from the string.

Figure 26:
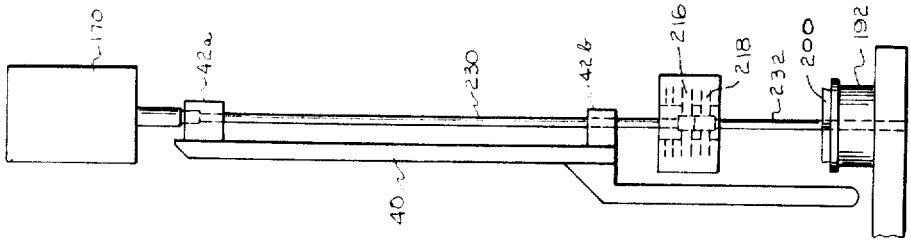

When the head 170 reaches the FIG. 26 position fluid is pumped into the upper ends of cylinders 204 to cause the jaws 200 to grip the pipe in the string and support the weight thereof. Also, the fluid cylinders 222 and 224 are powered to drive the jaws 216 and 218 into gripment with the adjacent portions of the pipes designated by numerals 230 and 232 in the drawings. The transfer arm may be moved into its upright position at this time, although its presence adjacent the string is not required until the FIG. 29 operation.

With the parts in the FIG. 26 position jaws 216 are powered around the string axis so as to untorque or loosen the joint between the pipes 230 and 232. The fluid motors within head 170 are de-energized until the jaws 216 and 218 are retracted as shown in FIG. 27.

Figure 27:
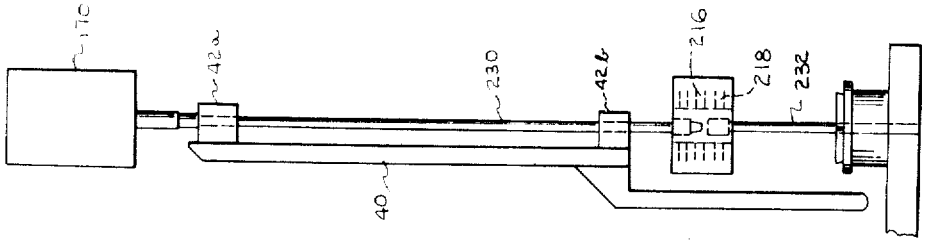

In the FIG. 27 operation the fluid motors within head 170 are energized to spin off the joint between pipes 230 and 232. During this spin-out operation the pressure within the lower ends of cylinders 174 is raised to elevate the head 170 for accommodating the upward shift of pipe 230 caused by the unthreading action.

Figure 28:
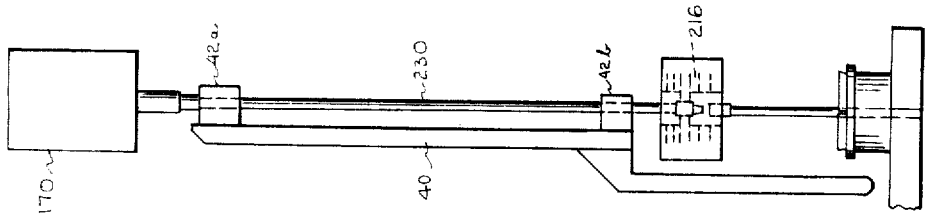
FIGS. 25 through 32 are schematic figures illustrating the movements of the FIG. 23 mechanisms which may be employed to remove a pipe length from the drill string.
Figure 29:
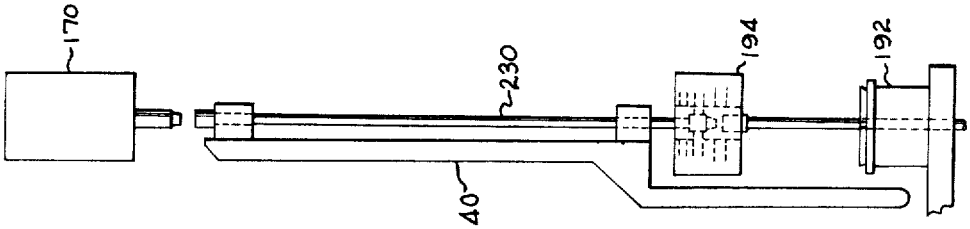

In the FIG. 28 operation jaws 216 are powered radially to grip pipe 230, and the fluid motors 182 energized to untorque the joint at upper end of pipe 230. FIG. 29 illustrates the condition after this joint has been fully spun out.

Figure 30:
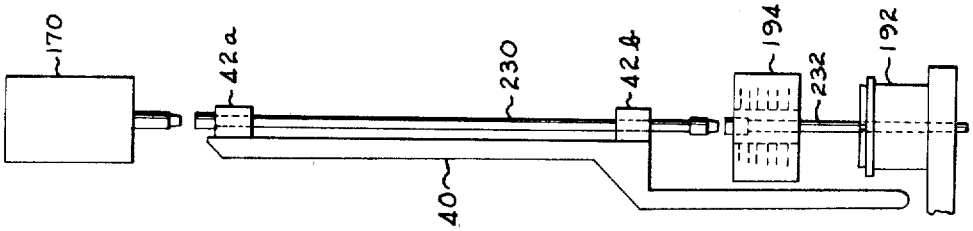

In the operation depicted by FIG. 30 the jaws 42a and 42b are powered closed and the chuck structure 194 is lowered (by energizing cylinders 210) to completely free the pipe 230 for the arcuate trip away from the string into the previously mentioned station 18.

Figure 32:
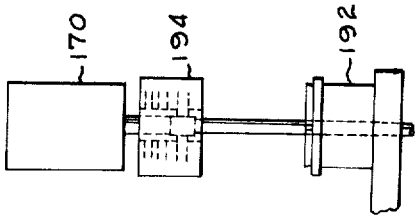
Figure 31:
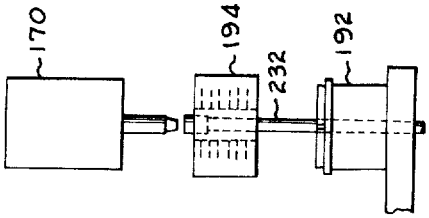

FIG. 31 illustrates the components as the head 170 travels down to screw into the pipe 232. FIG. 32 illustrates the condition which takes place during torqueing in of the joint at the upper end of the pipe, and FIG. 25 illustrates the condition which takes place after the joint has been made.

It will be appreciated that the sequence depicted by FIGS. 25 through 32 is repeated in order to remove each individual pipe from the string. The steps involved in adding each pipe to the string are essentially as follows:

(1) Separate the head from the string;

(2) Raise the head;

(3) Arc the transfer arm 40 up to place a new pipe between the head and chuck 194;

(4) Elevate chuck 194 and torque in the upper and lower joints in that order.

The jaws 214 are not utilized in removing pipe from the string; however, they are used during addition of pipe to the string, particularly as a guide means to guide the lower end of the new pipe into jaws 216 during step four described above.

The previously-described cylinder 142 (FIG. 22) is useful as a relief structure during the operation of making up the lower joint.

The apparatus may be utilized to drive casing (with the addition of suitable inserts and the making of adjustments necessitated by the increased diameter of the casing). However, in the driving of casing the pipe storage stations 14 may be bypassed and the casing transferred by trolleys 54 directly from beds 31 into station 18. Usually the time period required to drive casing and the length of casing required in a well hole are such that it is feasible to use the beds 31 as supplied with casing from haulaways without establishings a reserve of casing lengths. However the driving of pipe preferably is carried out with the use of storage stations 14. Preferably two such stations are used as shown in FIG. 1.

It is believed that with the above description the various operations involved in the well drilling sequence will be apparent. However, it is herein noted that when drilling operations are completed at a site the various pipes are withdrawn from the well hole and ultimately transferred to the temporary pipe support devices 31. During such operation the trolleys 54 may be operated, if desired, to carry the pipe from station 18 directly over to the pipe receiver device 31 without depositing the pipe in the bins 14. The bins are of course emptied of pipe by the trolleys 54 after or before removal of the pipe from the well hole. The pipe may be transferred onto the haulaway vehicles by driving the vehicles directly into the spaces occupied by receiver device 31, in which case the trolleys 54 may be utilized to directly load the pipe into the haulaway vehicles. If desired the bed devices 31 may be utilized as temporary unloader arrangements, and a crane means (not shown) utilized to transfer the pipe into the haulaway vehicles.

When all of the pipe and excess casing have been removed onto the haulaway vehicles the drill rig may then be returned to its FIG. 2 position. In this sequence of operations the trolleys 54 are first powered to positions on the tracks 56, after which derrick 20 is powered down to the prone position. The trolleys 54 are then moved back onto track extensions 58, and the walls 44 and 46 are folded in against the trailer sides so as to permit the rig to be driven to the next drilling site.

It will be appreciated that various features of the rig could be changed without departing from the spirit of the invention as defined in the appended claims.

We claim:

1. In an oil well drilling system, an elongated platform having ground-engaging transport means, an elongated derrick pivotally mounted at one end to said platform and movable between a prone transport position extending along the platform, and an upright drilling position at said one end of the platform, means for moving said derrick between said positions, means within said derrick for supporting a drill string when said derrick is in a vertical drilling position, pipe storage means comprising a pair of upright walls each pivoted at one end to one side of said platform at spaced points and movable between a position alongside said platform and a position transverse to said platform forming a pipe storage bin, pipe separators carried by the facing sides of said walls, a track fastened along the top of each said wall, a pipe transfer trolley support carried by said walls to overlie said platform whereby the trolley can be stored during platform transport, a pipe transfer trolley movable between said platform support and along said tracks when said walls are pivoted out to form a pipe bin, means for moving said trolley, grip means on said trolley to be actuated to grasp a pipe to move it from the pipe storage means to the platform, a pipe transfer arm pivotally mounted at one end adjacent said derrick pivot for movement in a vertical arc between said platform and said derrick elevated position, means for moving said transfer arm through said arc, pipe gripper means on said transfer arm, means carried by said platform for delivering pipe between said trolley and said transfer arm pipe gripper means, and means on said derrick to connect a pipe to a drill string supported thereby.

2. In a portable well drilling system, a wheeled platform having ground-engageable supports for fixably positioning said platform at a drilling site, a derrick pivotally mounted at one end to said platform and movable from horizontal transport position to vertical drilling position, means for moving said derrick between said positions, means carried by said derrick for supporting a drill string in a well hole when said derrick is in a drilling position, horizontal pipe storage means connected to and extending from a median portion of said platform, an elongated pipe transfer arm pivoted at one end to said platform and movable through an arc extending from a point adjacent the upper surface of said platform to said derrick vertical operating position, means for moving said transfer arm, means carried by said transfer arm for gripping a pipe, and conveyor means carried by said storage means and said platform and operable to deliver individual pipe from said storage means to said transfer arm gripping means.

3. In a portable well drilling system, a wheeled platform having ground-engageable supports for fixedly positioning said platform at a drilling site, a derrick pivotally mounted at one end to said platform and movable between a horizontal transport position overlying said platform and a vertical drilling position, means for moving said derrick, means carried by said derrick for suspending a drill string in a well hole when said derrick is in drilling position, an elongated pipe transfer arm pivoted at one end to said platform and movable through an arc extending from a point adjacent the upper surface of said platform and said derrick vertical drilling position, means carried by said transfer arm for gripping a pipe, means for moving said transfer arm, horizontal pipe storage means connected to and extending from a median portion of said platform, said pipe storage means including a pair of vertically disposed walls each pivoted at one end to spaced points on one side of said platform and positionable in parallel alignment and perpendicular to said platform, a plurality of vertically disposed and aligned pairs of separators on said walls defining vertical bins to receive a plurality of pipes in single stacked array and in parallel alignment with said pipe transfer arm horizontal position, and conveyor means carried by the pipe storage means and the platform and operable to deliver individual pipe from said storage means into said transfer arm gripping means when said transfer arm is in a horizontal position.

4. In a portable well drilling system, a wheeled platform having ground-engageable supports for fixedly positioning said platform at a drilling site, a derrick pivotally mounted at one end to said platform and movable between a horizontal transport position overlying said platform and a vertical drilling position, means for moving said derrick, a pipe transfer arm pivoted at one end to said platform and movable through an arc extending from a point adjacent the upper surface of said platform to said derrick drilling position, means carried by said transfer arm for gripping a pipe, means for moving said transfer arm, horizontal pipe storage means connected to and extending from a median portion of said platform, said pipe storage means including a pair of vertically disposed walls each pivoted at one end to spaced points on one side of said platform and positionable in parallel alignment and perpendicular to said platform, said walls defining bins adapted to receive a plurality of pipes in horizontal spaced, vertically aligned single stacked array, said walls each carrying a track in spaced relation above said bins, said track being positioned in parallel, horizontal alignment, pipe transfer trolley support means carried by said walls to overlie a portion of said platform, said pipe transfer trolley including support rollers operable on said tracks and said support means to move between said bins and a position overlying said platform, pipe pick-up means carried by said trolley and movable into said bins, and means carried by said platform for moving pipe between said position where said trolley overlies said platform and said transfer arm when in a horizontal position.

5. In a portable drilling rig, an elongated wheeled platform having ground-engageable supports to fix said platform in position at a drilling site, a derrick pivotally mounted at one end to said platform and movable between a horizontal transport position overlying said platform and a vertical drilling position, means for moving said derrick between said positions, means carried by said derrick and vertically movable thereon for suspending a vertically disposed drill string in a well hole below said derrick in its vertical position, pipe storage means carried by said platform and comprising a pair of vertically disposed walls pivoted at one end to spaced points along one side of said platform and movable between a parallel, nested position alongside said platform and an extended parallel position perpendicular to said platform, pipe transfer trolley means including pipe pick-up means, support means for said trolley means carried by said walls and including a portion to overlie said platform with the walls in extended position, said trolley being movable along said support means, means for moving said trolley means, a pipe transfer arm pivoted at one end to said platform and movable between a horizontal position above and adjacent said platform and a position adjacent said derrick vertical position, means for moving said transfer arm, and means carried by said platform for moving pipe from said trolley onto said transfer arm when in a horizontal position.

6. In a portable drilling rig, a portable platform having ground-engageable supports to fix said platform in horizontal position at a drilling site, a derrick pivotally mounted at one end to said platform and movable between a horizontal transport position and a vertical drilling position, means for moving said derrick, means carried by said derrick for supporting a drill string in a well hole below said derrick when in drilling position, a pipe transfer arm piovted at one end to said platform adjacent said derrick pivot and movable between a position adjacent the upper surface of said platform and a position adjacent said derrick vertical position, means for moving said transfer arm, a pipe transfer shuttle on said platform for moving pipe on and off said transfer arm, comprising spaced supports on the platform, rollers carried by said supports, a carriage movable on said rollers, pipe positioning means on said carriage, pipe positioning means on said supports, means for operating said positioning means, pipe storage means carried by said platform, a pipe transfer trolley including pipe pick-up means and moving means, and means carried by said storage means to support said trolley for movement between said storage means and said pipe positioning means on said supports.

7. In a portable drill rig, a portable platform having ground-engageable supports to fix said platform in horizontal position at a drilling site, a derrick pivotally mounted at one end to said platform and movable between a horizontal transport position and a vertical drilling position, means for moving said derrick, means carried by said derrick for supporting a drill string in a well hole below said derrick when in drilling position, a pipe transfer arm pivoted at one end to said platform and movable between a position adjacent the upper surface of said platform and a position adjacent said derrick vertical position, means for moving said transfer arm, a pipe transfer shuttle on said platform for moving pipe on and off said transfer arm, comprising spaced supports on said platform, rollers carried by said supports, a carriage movable on said rollers, pipe positioning means on said carriage comprising aligned sets of arms pivoted on said carraige and movable between pipe retaining and pipe released positions, pipe positioning means on said supports comprising aligned sets of arms pivoted on said supports and movable between pipe retaining and pipe released positions, means for moving said carriage arms and said support arms, pipe storage means carried by said platform, a pipe transfer trolley including pipe pick-up means, means for moving said trolley, and means carried by said storage means to support said trolley for movement between said storage means and said pipe positioning means on said supports.

8. In a portable drilling rig, a portable platform having ground-engageable supports to fix said platform in horizontal position at a drill site, a derrick pivotally mounted at one end to said platform and movable between a horizontal transport position and a vertical drilling position, means for moving said derrick, means carried by said derrick for supporting a drill string in a well hole below said derrick in its vertical drilling position, pipe storage means pivotally carried by said platform to support pipe alongside the platform, a pipe transfer shuttle on said platform to receive pipe from said storage means, a pipe transfer trolley carried on said storage means and movable between positions overlying said storage means and said shuttle, means for moving said trolley, pipe pick-up means on said trolley, a pipe transfer arm pivotally mounted at one end to said platform adjacent said derrick pivot point to receive pipe from said shuttle and transfer it to the drill axis, means for moving said transfer arm, and pipe grip means on said transfer arm.

9. A portable drilling rig as defined in claim 8 wherein the pipe gripping means on the transfer arm comprises a pair of opposed jaws pivoted to said arm on a common pivot, a hydraulic cylinder connected to said common pivot and having a movable piston, and links connecting said piston and each of said jaws, whereby movement of said piston is effective to open and close said jaws.

10. In a portable drilling rig, a portable platform having ground-engageable supports to fix said platform in horizontal position at a drill site, a derrick pivotally mounted at one end to said platform and movable between a horizontal transport position and a vertical drilling position, means for moving said derrick, means carried by said derrick for supporting a drill string in a well hole below said derrick in its vertical position, pipe storage means carried by said platform, a pipe transfer shuttle on said platform to receive pipe from said storage means, a pipe transfer trolley carried by said storage means for movement between positions overlying said storage means and said shuttle, pipe pick-up means on said trolley, a pipe transfer arm pivotally mounted at one end to said platform adjacent said derrick pivot to move a pipe to the drill axis, means for moving said transfer arm, a slide structure carried by said transfer arm, pipe grip means on said slide structure, and means for moving said slide structure whereby a pipe carried by said transfer arm can be adjusted vertically for aligned connection into the drill string.

*11. The method of assembling a drill string from a plurality of individual elongate drill pipes comprising the steps of supporting the uppermost pipe of the drill string*

*with its longitudinal axis lying in a vertical plane, locating the next pipe to be assembled into the string in a ready position in which the longitudinal axis thereof lies in said vertical plane, and pivoting said next pipe upwardly from said ready position in said vertical plane about a stationary horizontal axis perpendicular to said vertical plane and located in adjacent spaced relationship to the longitudinal axis of said uppermost pipe at the side thereof at which said ready position is located until said next pipe is located above and in coaxial alignment with said uppermost pipe, and connecting said next pipe and said uppermost pipe,*

*12. The method of assembling a drill string from a plurality of individual elongate drill pipes adapted to be threadably coupled to each other, each pipe having a male end and a female end, comprising the steps of supporting the uppermost pipe of a drill string with its longitudinal axis lying in a vertical plane and its female end uppermost, locating the next pipe to be assembled into said drill string in a ready position with the longitudinal axis of said next pipe lying in said vertical plane and the male end of said next pipe located in adjacent spaced relationship to said drill string, and pivoting said next pipe upwardly from said ready position in said vertical plane about a stationary horizontal axis perpendicular to said vertical plane and located in adjacent spaced relationship to the longitudinal axis of said uppermost pipe at the side thereof at which said ready position is located until the longitudinal axes of said pipes are in coaxial alignment with each other with said male end of said next pipe located adjacent said female end of said uppermost pipe, and connecting said next pipe and said uppermost pipe to each other.*

*13. The method of assembling a drill string from a plurality of individual elongate drill pipes adapted to be threadably coupled to each other, each pipe having a male end and a female end, comprising the steps of supporting the uppermost pipe of a drill string with its longitudinal axis lying in a vertical plane and its female end uppermost, storing a plurality of individual pipes at one side of said drill string with the longitudinal axes of the stored pipes located in parallel offset relationship to said vertical plane, and with the stored pipes lying in substantially horizontal positions with the male ends of the pipes adjacent the drill string, transferring a stored pipe to a ready position wherein the longitudinal axis of the transferred*

*pipe lies in a substantially horizontal position within said vertical plane, and pivoting the transferred pipe from its ready position upwardly from said ready position in said vertical plane about a stationary horizontal axis perpendicular to said vertical plane and located in adjacent spaced relationship to the longitudinal axis of said uppermost pipe at the side thereof at which said ready position is located until the longitudinal axes of said pipes are in coaxial alignment with each other with said male end of said next pipe located adjacent said female end of said uppermost pipe, and connecting said next pipe and said uppermost pipe to each other.*

References Cited

The following references, cited by the Examiner, are of record in the patented file of this patent or the original patent.

UNITED STATES PATENTS

| | | | |
|---|---|---|---|
| 561,715 | 6/1896 | Lynch. | |
| 1,029,139 | 6/1912 | Moltrup | 211—60 X |
| 1,884,874 | 10/1932 | Ross | 175—85 X |
| 2,450,934 | 10/1948 | Calhoun | 175—85 X |
| 2,543,274 | 2/1951 | Bender | 211—60 |
| 2,633,333 | 3/1953 | Storm | 175—85 X |
| 2,658,352 | 11/1953 | Haeg et al. | 166—46 X |
| 2,781,185 | 2/1957 | Robbins | 175—85 X |
| 2,783,971 | 3/1957 | Carle et al. | 173—147 X |
| 2,807,441 | 9/1957 | Sewell | 175—201 X |
| 2,848,196 | 8/1958 | Simmonds | 175—85 X |
| 2,880,881 | 4/1959 | Robishaw | 211—60 |
| 2,956,782 | 10/1960 | Mistrot | 175—85 X |
| 2,972,388 | 2/1961 | Thornburg | 175—52 |
| 2,999,605 | 9/1961 | De Jarnett | 214—2.5 |
| 3,002,560 | 10/1961 | Paget | 175—85 X |
| 3,058,533 | 10/1962 | Collins | 175—85 |
| 3,095,048 | 6/1963 | O'Neill et al. | 175—85 X |
| 3,158,211 | 11/1964 | McCue et al. | 175—85 X |
| 3,177,944 | 4/1965 | Knights | 175—85 X |

FOREIGN PATENTS

| | | |
|---|---|---|
| 1,183,307 | 7/1959 | France. |
| 421,562 | 11/1925 | Germany. |

CHARLES E. O'CONNELL, *Primary Examiner.*

IAN A. CALVERT, *Assistant Examiner.*